United States Patent [19]

Noyama et al.

[11] Patent Number: 5,376,726
[45] Date of Patent: Dec. 27, 1994

[54] SHORT FIBER-REINFORCED RUBBER

[75] Inventors: Tomoko Noyama, Takarazuka; Akihiro Nakahara, Ibaragi, both of Japan

[73] Assignee: Sumitomo Rubber Industries, Ltd., Hyogo, Japan

[21] Appl. No.: 876,435

[22] Filed: Apr. 30, 1992

[30] Foreign Application Priority Data

Apr. 30, 1991 [JP] Japan .................. 3-098621

[51] Int. Cl.$^5$ .................. C08L 9/00; C08L 23/26; C08L 33/20; C08L 11/00
[52] U.S. Cl. .................. 525/193; 525/233; 525/238
[58] Field of Search .................. 525/233, 193, 238

[56] References Cited

U.S. PATENT DOCUMENTS 4,266,772  5/1981  Martin et al. .................. 273/218'
4,936,814  6/1990  Colley et al. .................. 474/263

FOREIGN PATENT DOCUMENTS 0320325  6/1989  European Pat. Off. .
0454411  10/1991  European Pat. Off. .
2343385  3/1974  Germany .
44241  1/1992  Japan .

OTHER PUBLICATIONS

Chemical Abstracts, vol. 115, No. 6, 1991; Abstract No. 51654S Abstract of JP03031536 Pub 12 Feb.1991.

*Primary Examiner*—Carman J. Seccuro, Jr.
*Attorney, Agent, or Firm*—Birch, Stewart, Kolasch & Birch

[57] ABSTRACT

Disclosed is a short fiber-reinforced rubber wherein a fibrilated polyacrylonitrile short fiber is uniformly dispersed in a rubber, and a process for producing the same.

7 Claims, No Drawings

SHORT FIBER-REINFORCED RUBBER

FIELD OF THE INVENTION

The present invention relates to a short fiber-reinforced rubber and a process for producing the same. More particularly, it relates to a short-fiber reinforced rubber having high strength and modulus and a process wherein such the short fiber-reinforced rubber can be easily produced.

BACKGROUND OF THE INVENTION

A short fiber-reinforced rubber wherein a short fiber is formulated in order to provide strength or functionality (e.g. anisotropy, durability, etc.) to a rubber has been known. Properties of reinforced rubber very depending upon a kind, amount, orientation and dispersion state of the short fiber. Particularly, the improvement of properties such as strength, modulus, etc. are obtained, for example, by the improvement of the short fiber-rubber interactions (e.g. adhesion, bonding property, etc.). The improvement of short fiber-rubber interactions can be conducted, for example, by subjecting the short fiber to a surface treatment [e.g. resolcin-formalin-latex (RFL), etc.] or a surface modification (e.g. graft treatment, plasma treatment, etc.).

However, the surface treatment or surface modification of the short fiber is a complicated process in the production of the short fiber-reinforced rubber. In addition, it is generally costly and time consuming to develop a suitable surface treating agent or a surface modification method.

SUMMARY OF THE INVENTION

One object of the invention is to provide a short fiber-reinforced rubber having excellent strength and modulus, wherein the dispersion property of a short fiber in a rubber and the short fiber-rubber interactions are improved, without subjecting the short fiber to a surface treatment or surface modification.

Another object of the present invention is to provide a process wherein a short fiber-reinforced rubber can be easily produced.

These objects as well as other objects and advantages will become apparent to those skilled in the art from the following description.

In order to attain the above objects, the present inventors have studied intensively. As a result, the present invention have found that, if a short fiber-formulated rubber composition is kneaded while applying a strong shear force, the short fiber is torn, which results in a uniform dispersion and network, namely, uniform fibrillation, and the present invention has been completed.

That is, according to the present invention, there is provided a short fiber-reinforced rubber wherein a fibrillated polyacrylonitrile short fiber is uniformly dispersed in a rubber.

The present invention also provides a process for producing a short fiber-reinforced rubber which comprises kneading an rubber composition containing a base rubber, a polyacrylonitrile fiber of not less than 10 μm in length, a crosslinking co-agent, and an organic peroxide while applying a shear force.

The process of the present invention is particularly useful for rubbers vulcanized by an organic peroxide, although it can also be applied for those vulcanized by sulfur and the like.

DETAILED DESCRIPTION OF THE INVENTION

The base rubber used in the present invention is not specifically limited and it may be any rubber which has been used for a rubber composition heretofore. Examples thereof include isoprene rubber, natural rubber, butadiene rubber, styrene-butadiene rubber, nitrile rubber, ethylene rubber, ethylene propylene rubber, chloroprene rubber and the like, and one or more types of rubber may be used. Particularly preferred base rubber is cis-1,4-polybutadiene, the percentage of cis structure of which is not less than 90%. Further, it is preferred to use a base rubber which has been kneaded while applying a shear force in a direction predetermined in advance, as described in Japanese Patent Application No. 2-106713. When such a rubber having high hardness and modulus and having anisotropic strength is used, the strength of the resulting short fiber-reinforced rubber is further enhanced. An amount of the base rubber formulated is preferably 70 to 99 volume % for the rubber composition.

As the short fiber formulated in the rubber composition, polyacrylonitrile (PAN) fiber is suitable. Polyacrylonitrile is easily fibrillated by a shear force applied during kneading of the rubber composition, which provides high performance to the rubber. It is firmly fixed and adhered to the rubber matrix by fibrillation while, at the same time, maintains its performance as a reinforcing fiber. Other fibers (e.g. aromatic polyamide fiber, polyester fiber, polyethylene fiber, etc.) may be added to the above-described polyacrylonitrile fiber in small amounts. As described above, it is not necessary that these fibers be subjected to a surface treatment or surface modification. However, in order to further enhance the strength of the short fiber-reinforced rubber, a heat stretching treatment or adhesion treatment may be conducted. The length (L) of the short fiber is preferably not less than 10 μm, particularly 1 to 10 mm. Further, the ratio (L/D) of a fiber length (L) to a fiber diameter (D) is preferably not less than 10, particularly 50 to 1000. When the ratio is less than 10, the rubber can not be provided with sufficiently high strength. The amount of the short fiber formulated is preferably 1 to 30 volume % for the rubber composition. When the amount is less than 1 volume %, the rubber can not be provided with sufficiently high strength and, when the amount exceeds 30 volume %, a formability problem arises in formability.

As the crosslinking co-agent which is optionally used in the present invention, for example, there is a metal salt of $\alpha,\beta$-unsaturated fatty acid. As the metal salt of $\alpha,\beta$-unsaturated fatty acid, a metal salt of $\alpha,\beta$-monoethylenically unsaturated carboxylic acid having 3 to 8 carbon atoms is preferred, and examples thereof include a metal salt of methacrylic acid, acrylic acid, iraconic acid, crotonic acid, and the like. As the metal, for example, divalent metals such as zinc, magnesium and the like are preferred, although other metals (e.g. sodium, lithium, aluminum, etc.) may be used. The amount of the crosslinking agent is preferably 5 to 80 volume %, particularly 10 to 30 volume %. Further, this ingredient may be formulated in the form of a metal oxide, hydroxide or carbonate with $\alpha,\beta$-unsaturated fatty acid to form a salt in the rubber composition.

Examples of the organic peroxide which may be optionally formulated in the rubber composition of the present invention, for example, there are perbenzoic acid, benzoyl peroxide, cumene peroxide, dicumyl peroxide and the like. Dicumyl peroxide is preferred. The amount of the organic peroxide is preferably 0.1 to 5 volume % for the rubber composition.

Further, additives such as fillers (e.g. silica, calcium carbonate, etc.), colorants, antioxidants and the like may be formulated in the rubber composition.

respectively. The rubber composition thus kneaded was formed by passing it through an open roll, followed by vulcanization at 160° C. for 25 minutes. The strength, modulus and hardness of each short fiber-reinforced rubber was determined and the results are shown in Table 1. Further, each measuring test was conducted according to JIS-K6301.

TABLE 1

|  | Example 1 | Example 2 | Comp. Ex. 1 | Comp. Ex. 2 | Comp. Ex. 3 |
| --- | --- | --- | --- | --- | --- |
| Butadiene rubber | 70 | 70 | 70 | 70 | 70 |
| Natural rubber | 15 | 15 | 15 | 15 | 15 |
| Ethylene propylene rubber | 15 | 15 | 15 | 15 | 15 |
| Zinc oxide | 32 | 32 | 32 | 32 | 32 |
| Methacrylic acid | 30 | 3 | 30 | 30 | 30 |
| Dicumyl peroxide | 1.0 | 1.0 | 1.0 | 1.0 | 1.0 |
| PAN fiber (vol %)*1 | 10 | 10 | 10 | — | — |
| Nylon 66 (vo %) | — | — | — | 10 | — |
| RFL-treated nylon 66 (vol %) | — | — | — | — | 10 |
| Rotating spead(rpm) | 30 | 30 | 30 | 30 | 30 |
| Kneading time (min) | 10 | 25 | 5 | 10 | 10 |
| Breaking strength (MPa) | 33 | 36 | 23 | 26 | 29 |
| Elongation at breakage (%) | 19 | 17 | 18 | 57 | 21 |
| 10% Modulus (MPa) | 19 | 25 | 16 | 7 | 13 |
| Tear strength(kN/m) | 92 | 99 | 83 | 89 | 73 |
| Hardness (JIS-A) | 95 | 97 | 94 | 90 | 91 |

*1: Atrane, manufactured by Toray Co.
Length (L); 5 mm, Diameter (D); 2d (denier)

The short fiber-reinforced rubber of the present invention is produced by kneading the above rubber composition while applying a shear force, followed by vulcanization forming. A strong shear force is applied to the short fiber during kneading and, as a result, At is fibrillated and, therefore, dispersibility in the rubber is improved. As the method of kneading while applying a shear force, a method comprising charging an appropriate amount (65 to 95%) of a rubber composition upon mixing and kneading with a kneader or Banbury mixer at a rotating speed of at least 20 rpm for at least 10 minutes, particularly at a rotating speed of 4 to 200 rpm for 10 to 50 minutes is preferred. When the rotating speed is less than 20 rpm and the mixing time is less than 10 minutes, the short fiber is not sufficiently fibrillated. Thereafter, the rubber composition is formed by passing it through an open roll at one direction, followed by a normal vulcanization (140° to 170° C., 10 to 40 minutes) to obtain a short fiber-reinforced rubber of the present invention.

The short fiber-reinforced rubber thus obtained as described above has high strength and modulus, for example, it is suitably used for a timing belt, marine material, chain, rubber spring and the like.

According to the present invention, a short fiber-reinforced rubber having excellent strength and modulus can be easily produced without subjecting a short rubber to a surface treatment or surface modification.

The following Examples and Comparative Examples further illustrate the present invention in detail but are not to be construed to limit the scope thereof. In the Examples and Comparative Examples, all "parts" are by weight unless otherwise stated.

EXAMPLES 1 AND 2 AND COMPARATIVE EXAMPLES 1 to 3

Each rubber composition comprising the ingredients shown in Table 1 was charged in a mixing container at about 70%, followed by kneading under the conditions of rotating speed and kneading time shown in Table 1, As is clear from Table 1, the short fiber-reinforced rubber of Examples 1 and 2 has high strength and modulus in comparison with Comparative Example 1, because the short fib is fibrillated by increasing the kneading time. Further, a short fiber-reinforced rubber of Examples 1 and 2 has high strength and modulus in comparison with Comparative Examples 2 and 3, because dispersibility of the short fiber in the rubber, as well as rubber-short fiber interactions are improved.

What is claimed is:

1. A short fiber-reinforced rubber comprising:
   uniformly fibrillated polyacrylonitrile short fibers having a length of 1 to 10 mm, which fibers are uniformly dispersed in the rubber,
   a base diene or mono-olefin rubber,
   a crosslinking co-agent which is a metal salt of an α,β-unsaturated fatty acid, and
   an organic peroxide.

2. The short fiber-reinforced rubber according to claim 1 wherein said base rubber is a cis-1,4-polybutadiene having a cis structure of 90% or more.

3. The short fiber-reinforced rubber according to claim 1 wherein said crosslinking co-agent is present in an amount of 5 to 80 volume %, and said organic peroxide is present in an amount of 0.1 to 5 volume %, based on the whole rubber mixture.

4. A process for producing a short fiber-reinforced rubber according to claim 1, which comprises kneading a rubber composition containing a base rubber, a polyacrylonitrile fiber of not less than 10 μm in length, a crosslinking co-agent and an organic peroxide while applying a shear force.

5. The process according to claim 4, wherein said kneading is carried out in a kneader or Banbury mixer at a rotating speed of at least 20 rpm for at least 10 minutes.

6. The short fiber-reinforced rubber according to claim 1, wherein said metal salt is formed by the reaction of a metal oxide, hydroxide, or carbonate with an α,β-unsaturated fatty acid in the rubber composition.

7. The short fiber-reinforced rubber according to claim 1, wherein said metal salt is formed from a metal selected from the group consisting of zinc, magnesium, sodium, lithium and aluminum, and said α,β-unsaturated fatty acid is selected from the group consisting of methacrylic acid, acrylic acid, itaconic acid, and crotonic acid.

* * * * *